(No Model.)

J. VOM HOFE.
FISHING REEL.

No. 252,554. Patented Jan. 17, 1882.

WITNESSES:
Dom Twitchell
C. Sedgwick

INVENTOR:
J. vom Hofe
BY Munn & Co
ATTORNEYS.

UNITED STATES PATENT OFFICE.

JULIUS VOM HOFE, OF BROOKLYN, E. D., ASSIGNOR TO HIMSELF AND CHARLES F. IMBRIE, OF NEW YORK, N. Y.

FISHING-REEL.

SPECIFICATION forming part of Letters Patent No. 252,554, dated January 17, 1882.

Application filed November 12, 1881. (No model.)

*To all whom it may concern:*

Be it known that I, JULIUS VOM HOFE, of Brooklyn, E. D., in the county of Kings and State of New York, have invented a new and useful Improvement in Fishing-Reels, of which the following is a full, clear, and exact description.

Fishing-reels become quickly worn at the bearings of the spool and gearing, and as usually constructed are expensive to repair when so worn.

The object of my invention is to provide for adjustment of the bearings, so that wear can be readily compensated and the reels kept in good condition without expense; and to that end it consists in screw-pivots combined with the reel, as hereinafter described and claimed.

Reference is to be had to the accompanying drawings, forming part of this specification, in which similar letters of reference indicate corresponding parts in all the figures.

Figure 1:
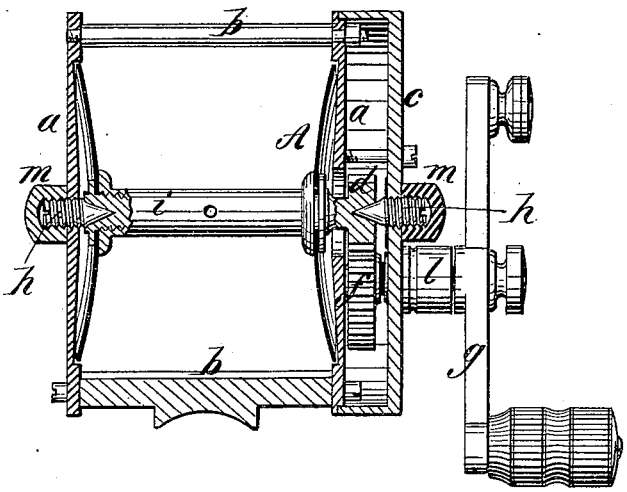
Figure 2:
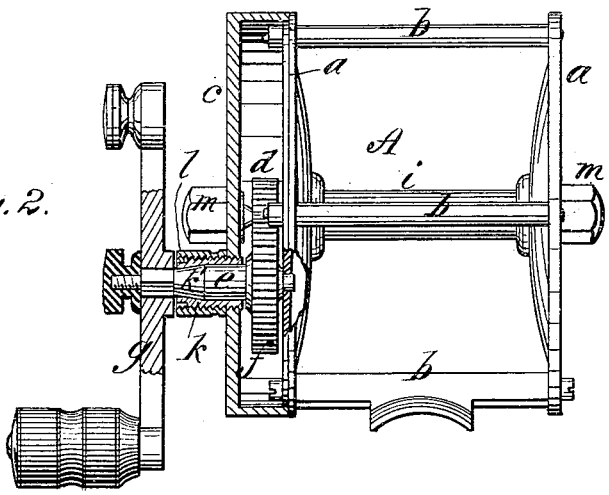
Figure 3:
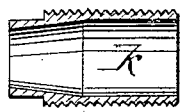
Figure 4:
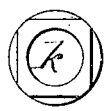
Figure 4:
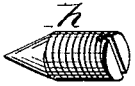

Figure 1 is a longitudinal section of my improved reel. Fig. 2 is a side view, in section, at one end in the line of the handle-arbor. Fig. 3 represents the tightening-sleeve of the handle-arbor, and Fig. 4 shows one reel pivot separately.

The reel-frame, composed of plates $a\ a$, connected by rods $b$ and a cap, $c$, covering the gearing, is of usual construction.

A is the reel or spool, provided with pinion $d$ on one end of its axis $i$.

$f$ is a larger pinion on an arbor, $e$, and engaging pinion $d$; and $g$ is the handle, fixed on the arbor $e$.

The reel is sustained by pivot-screws $h\ h$, tapped through one end plate, $a$, and cap-plate $c$, and having conical ends entering recesses of the same form in the ends of axis $i$, so that by turning the screws in and out the reel can be positioned and adjusted. The arbor $e$ of pinion $f$ has a bearing at one end in plate $a$, and at the other end is sustained by a screw sleeve, $k$, fitted in plate $c$. The arbor has a beveled portion, $k'$, within the sleeve, and the sleeve is correspondingly beveled at its outer end, so that by endwise adjustment of the sleeve the arbor is set to run smoothly without endwise motion. An outer sleeve, $l$, screwed on sleeve $k$ and against the cap-plate, serves as a set-nut and gives a finished appearance. The pivot-screws $h$ are covered by screw-caps $m\ m$, which serve as set-nuts and protect the projecting screws.

With this construction the reel can be set to run with perfect accuracy, and as the bearings become worn adjustment can be readily made. By removing caps $m$ the pivots become accessible for tightening the bearings, and the sleeve $k$ is made accessible for the same purpose by removing the handle $g$ and outer sleeve, $l$. The outer end of sleeve $k$ is formed to receive a wrench, as shown in Fig. 3.

Having thus described my invention, I claim as new and desire to secure by Letters Patent—

1. In a fishing-reel, the combination, with the frame $a\ b$, the cap $c$, and the axis $i$, having conical recesses in its ends, of the pivot-screws $h$, having conical ends, and the caps $m$, screwed upon the said pivot-screws, substantially as and for the purpose set forth.

2. In a fishing-reel, the combination, with the plates $a\ c$, and the arbor $e$, having beveled portion $k'$, of the sleeve $k$, having its outer end beveled, and the outer sleeve, $l$, substantially as and for the purpose set forth.

JULIUS VOM HOFE.

Witnesses:
GEO. D. WALKER,
C. SEDGWICK.